United States Patent [19]
Katsura et al.

[11] Patent Number: 6,074,577
[45] Date of Patent: Jun. 13, 2000

[54] METHOD OF MOLDING AN OPTICAL CONNECTOR FERRULE

[75] Inventors: Hiroshi Katsura; Makoto Honjo; Toshiaki Kakii; Wataru Sakurai; Masahiro Shibata, all of Yokohama, Japan

[73] Assignee: Sumitomo Electric Industries, Ltd., Osaka, Japan

[21] Appl. No.: 08/998,942

[22] Filed: Dec. 29, 1997

[30] Foreign Application Priority Data

Dec. 27, 1996 [JP] Japan ................................ 8-349263
Dec. 8, 1997 [JP] Japan ................................ 9-336220

[51] Int. Cl.[7] .................................................. B29D 11/00
[52] U.S. Cl. ......................... 264/1.25; 425/577; 425/468
[58] Field of Search .................................. 425/468, 577, 425/186, 192 R, 116, 117; 264/1.25, 1.24, 1.1; 249/64, 177, 63, 142

[56] References Cited

U.S. PATENT DOCUMENTS

| | | | |
|---|---|---|---|
| 5,275,765 | 1/1994 | Go et al. ................................ | 264/1.25 |
| 5,707,565 | 1/1998 | Suzuki et al. .......................... | 264/1.25 |
| 5,780,079 | 7/1998 | Lee ........................................ | 264/1.25 |
| 5,786,002 | 7/1998 | Dean et al. ............................ | 264/1.25 |

FOREIGN PATENT DOCUMENTS 2 276 583  10/1994  United Kingdom .

OTHER PUBLICATIONS

Patent Abstracts of Japan, vol. 096, No. 005, May 1996 re JP–A 08 015570.

Patent Abstracts of Japan, vol. 007; No. 206 (P–222), Sep. 1983 re JP–A 58 102912.

Patent Abstracts of Japan, vol. 008, No. 228 (P–308), Oct. 1984 re JP–A 59 109010.

Patent Abstracts of Japan, vol. 011, No. 270 (P–611), Sep. 1987 re JP–A 62 070807.

*Primary Examiner*—Mathieu D. Vargot
*Attorney, Agent, or Firm*—Pillsbury Madison & Sutro LLP

[57] ABSTRACT

An end-face-side core 5 from which an optical fiber hole forming pin 1 is projected is fastened by a mold to a fiber-side core 10 from which an optical fiber hole forming pin 6 and a cavity forming member (for example, a tape fiber hole forming rectangular body 8) are projected, while the end-face-side core and the fiber-side core are opposed to each other, the cavity forming member being behind the optical fiber hole forming pin 6 and larger than the optical fiber hole forming pin. A resin is injected into a cavity formed in the mold. The mold is opened, the end-face-side core 5 and the fiber-side core 10 are slid in directions in which the end-face-side core and the fiber-side core are separated from each other, and a resin molded product is then taken out.

20 Claims, 11 Drawing Sheets

METHOD OF MOLDING AN OPTICAL CONNECTOR FERRULE

BACKGROUND OF THE INVENTION

1. Field of the Invention

The invention relates to a method of molding an optical connector ferrule which is made of a resin.

2. Description of the Related Art

An optical connector in which plural optical fibers are fixed in parallel and guide pin holes are in parallel with them at their both sides is called an MT connector and widely used. An optical connector ferrule which is used in such an optical connector is molded by a transfer molding process using a thermosetting resin, or an injection molding process using a thermoplastic resin. In these processes, molding is basically conducted by interposing a core between upper and lower mold parts and injecting a resin into a cavity formed by the mold members.

FIGS. 6A and 6B show an example of a mold which is used in a molding process of the prior art. In the figure, FIG. 6A is a perspective view showing the state in which the mold is opened, and FIG. 6B is a front view showing the state in which the mold is set.

This example uses a core in which large-diameter guide pin hole forming pins 42, a tape fiber hole forming rectangular body 43, and a small-diameter optical fiber hole forming pins 41 are projected from a cavity block 44. The portions of the guide pin hole forming pins 42 and the optical fiber hole forming pins 41 which are close to the respective tip end portions are held by V-grooves 45b and 45a formed in a lower mold part 45, and fixed by fastening an upper mold part 46 to the lower mold part. In order to ensure precise alignment of optical fibers inserted into the optical fiber holes, the V-grooves 45b and 45a are precisely worked. In each of the optical fiber hole forming pins 41, the tip end portion has a reduced diameter and the rear portion 41a has a diameter which is larger than the reduced diameter.

A molding resin is injected into a cavity 49 which is formed around the guide pin hole forming pins 42, the tape fiber hole forming rectangular body 43, and the small-diameter optical fiber hole forming pins 41, and then cured. The upper and lower mold parts 46 and 45 are removed away and the resulting resin molded product is then pulled out from the core.

FIG. 7A is a perspective view of the resin molded product, and FIG. 7B is a section view of the resin molded product along the plane X—X' and Y—Y'. The resin molded product 50 has guide pin holes 51 and optical fiber holes 52. The diameter of each optical fiber hole is small in the tip end portion and increased in a middle portion. The optical fiber holes communicate with a taper fiber hole 54. The reference numeral 53 designates an opening through which an adhesive agent for fixation is supplied when a tape fiber wherein the covering of the tip end portion is removed away is inserted into the resin molded product, i.e., the optical connector ferrule. A projection 47 of the upper mold part 46 shown in FIGS. 6A and 6B is used for forming the opening. In FIG. 7A, the respective sizes are, for example, as follows:

The height of the resin molded product 50: 2.5 mm

The width of the resin molded product 50: 6.4 mm

The length of the resin molded product 50: 8 mm

The diameter of the optical fiber holes 52: 0.125 mm

The diameter of the guide pin holes 51: 0.7 mm

Since the large-diameter guide pin hole forming pins 42 and small-diameter optical fiber hole forming pins 41 which are attached to the core are held by the V-grooves 45b or 45a of the lower mold part 45 and a projection 48 of the upper mold part 46, there exist small spaces defined by the pins, the V-grooves, and the upper mold part. When a resin is injected into the cavity, therefore, the resin enters also these spaces. The entering resin must be removed away as chippings when the mold is opened and the resin molded product is taken out. If the removal is not perfectly conducted, the resin partly remains in the V-grooves. When the pins are set in the V-grooves for the next time, therefore, the pins are positionally deviated by the remaining resin, so that the alignment accuracy of the positions of the guide pin insertion holes and the optical fiber insertion holes is lowered.

SUMMARY OF THE INVENTION

The invention has been made under the above circumstances, and therefore an object of the invention is to improve the molding method of the prior art so as to enhance the positional alignment accuracy of a guide pin insertion hole and an optical fiber insertion hole.

According to the invention, an end-face-side core in which at least one optical hole forming pin is provided so as to be projected therefrom and a fiber-side core in which at least one optical fiber hole forming pin and other members are provided so as to be projected therefrom are fastened to form a mold together with cavity-blocks, while the end-face-side core and the fiber-side core are opposed to each other, said members being behind the optical fiber forming pin, a resin is injected into a cavity formed in the mold, the mold is opened, the end-face-side core and the fiber-side core are slit in a direction in which the cores are to be separated from each other, and a resin molded product is taken out.

Namely, two cores, i.e., the end-face-side core and the fiber-side core are prepared, and an optical fiber insertion hole forming pin is previously disposed on each of the cores so as to be projected therefrom. According to this configuration, it is not required to remove the pins from the V-grooves on the end-face-side core for each molding operation. Since, unlike the conventional methods, the so-called core is split into two portions, i.e., the end-face-side core and the fiber-side core, a resin molded product can be easily taken out by sliding the cores in directions in which the cores are to be separated from each other.

A guide pin hole forming pin may be projected together with the optical fiber hole forming pin from the end-face-side core and the fiber-side core. Plural optical fiber hole forming pins and guide pin hole forming pins may be arranged in a single plane. Alternatively, as shown in FIG. 10, plural stages in each of which optical fiber hole forming pins are arranged in a plane may be formed.

In order to precisely maintain the relative position of the optical fiber hole forming pins and the guide pin hole forming pins, the pins are held and fixed by a lower member having a V-groove which is precisely worked, and an upper member which covers the lower member, and disposed on the end-face-side core or the fiber-side core so as to be projected therefrom. When the core is produced, the upper and lower members are produced separately from one other. After the optical fiber hole forming pin and the like are set and the core is assembled, however, the upper and lower members are not separated from one other for each molding operation.

Preferably, a gap which is formed between the optical fiber hole forming pin or the guide pin hole forming pin, and the V-grooves of the lower and upper cavity-blocks are filled with a filling member, thereby preventing the molding resin from entering the gap.

In order to prevent the molding resin from entering a gap which is formed between the optical fiber hole forming pin or the guide pin hole forming pin, and the V-groove of the lower member and the upper member, it is effective to fit a plate having holes which respectively coincide with the optical fiber hole forming pin and the guide pin hole forming pin, to a cavity-side portion and portions which are inside the end-face-side core or the fiber-side core and which are close to the cavity, thereby preventing the gap from communicating with the cavity.

The optical fiber hole forming pin of the end-face-side core may be configured to a small-diameter pin having a sharpened tip end, the optical fiber hole forming pin of the fiber-side core may be configured to a member which has a hole at least in a tip end portion, the hole being larger in diameter than the small-diameter pin to enable the small-diameter pin to enter the hole, and, when the end-face-side core and the fiber-side core are opposed to each other, the small-diameter pin may be inserted into the hole at the tip end of the large-diameter member. According to this configuration, the positions of the optical fiber hole forming pins of the end-face-side core and the fiber-side core can be stably maintained against the filling pressure of the molding resin.

The method can be modified to comply with the case where the optical fiber hole forming pin of end-face-side core is short, only by configuring the method in the following manner. The optical fiber hole forming pin of the end-face-side core is configured to a column-like small-diameter pin, the optical fiber hole forming pin of the fiber-side core is configured to a column-like pin which is larger in diameter than the small-diameter pin, and, when the end-face-side core and the fiber-side core are opposed to each other, tip end faces of the small-diameter pin and the large-diameter pin are in contact with each other or butt against each other with forming a very small gap formed therebetween.

With respect to a guide pin also, the guide pin hole forming pin of the end-face-side core is configured to a pin having a sharpened tip end, the guide pin hole forming pin of the fiber-side core is configured to a member which has a hole at least in a tip end portion, the hole being larger in diameter than the sharpened pin to enable the pin to enter the hole, and, when the end-face-side core and the fiber-side core are opposed to each other, the sharpened pin is inserted into the hole at the tip end of the large-diameter member. According to this configuration, the pins are also supported at their ends and hence stabilized.

Alternatively, the guide pin hole forming pin of the end-face-side core may be made longer, and a hole may be formed in the fiber-side core block, so that, when the end-face-side core and the fiber-side core are opposed to each other, the tip end of the guide pin hole forming pin of the end-face-side core is inserted into the hole of the fiber-side core.

When the end-face-side core and the fiber-side core are opposed to each other, the tip end portion of the guide pin hole forming pin of the end-face-side core is first inserted into the hole of the tip end portion of the guide pin hole forming pin of the fiber-side core or a hole of the fiber-side core, and the tip end portion of the optical fiber hole forming pin of the end-face-side core is then inserted into the hole of the tip end portion of the optical fiber hole forming pin of the fiber-side core. According to this configuration, the positioning is first conducted by using the guide pin hole forming pin and hence also the insertion of the optical fiber hole forming pin is stably performed.

With respect to the guide pin hole forming pin also, the guide pin hole forming pin of the end-face-side core may be configured to a column-like pin, the guide pin hole forming pin of the fiber-side core may be configured to a column-like pin which is equal to or larger in diameter than the guide pin hole forming pin of the end-face-side core, and, when the end-face-side core and the fiber-side core are opposed to each other, tip end faces of the guide pin hole forming pins of the end-face-side core and the fiber-side core may be in contact with each other or butt against each other with forming a very small gap formed therebetween.

When the end-face-side core and the fiber-side core are fastened together with cavity-blocks while the cores are opposed to each other, the guide pin hole forming pin of the fiber-side core may be held by a V-groove formed on the surface of the lower cavity-block. According to this configuration, the positional relationships between the cores and the cavity-blocks are stabilized.

When the end-face-side core and the fiber-side core are fastened to each other from both the sides by the mold while the cores are opposed to each other, butting faces of the guide pin hole forming pins of the end-face-side core and the fiber-side core may be held by a V-groove formed in the mold. When the guide pin hole forming pin is to be held by a V-groove formed in the mold, it is preferable to fit a sheet-like plate to a cavity-side portion of the V-groove so as to prevent the mold resin from entering a gap between the V-groove and the guide pin hole forming pin.

BRIEF DESCRIPTION OF THE DRAWINGS

FIGS. 2A to 2D are side views of various examples of an optical fiber hole forming pin and a guide pin hole forming pin, in which FIGS. 2A and 2B show optical fiber hole forming pins, and FIGS. 2C and 2D guide pin hole forming pins;

FIGS. 3A and 3B are front views of the portion where forming pins are projectingly formed on a core, in which FIG. 3A shows an end-face-side core, and FIG. 3B shows a fiber-side core;

FIG. 6A is a perspective view showing the state in which the mold is opened, and FIG. 6B is a front view showing the state in which the mold is set;

FIGS. 7A and 7B show a shape of a resin molded product, in which FIG. 7A is a perspective view, and FIG. 7B is a section view along the plane X—X' and Y—Y';

FIGS. 8A to 8C is a plan views of a state in which an end-face-side core and a fiber-side core are opposed to each other, in which FIG. 8A shows a case where the optical fiber hole forming pins and the guide pin hole forming pins are inserted, FIG. 8C shows a case where the optical fiber hole forming pins and the guide pin hole forming pine butt against each other, and FIG. 8C shows an example in which the fiber hole forming pins are inserted and the guide pin hole forming pins are disposed only on the end-face-side core;

FIGS. 11A and 11B is a view showing an example of a resin-entrance preventing plate, in which FIG. 11A is a perspective view of the end-face-side core, and FIG. 11B is a section view along X—X'.

DETAILED DESCRIPTION OF THE PREFERRED EMBODIMENTS

Figure 1:
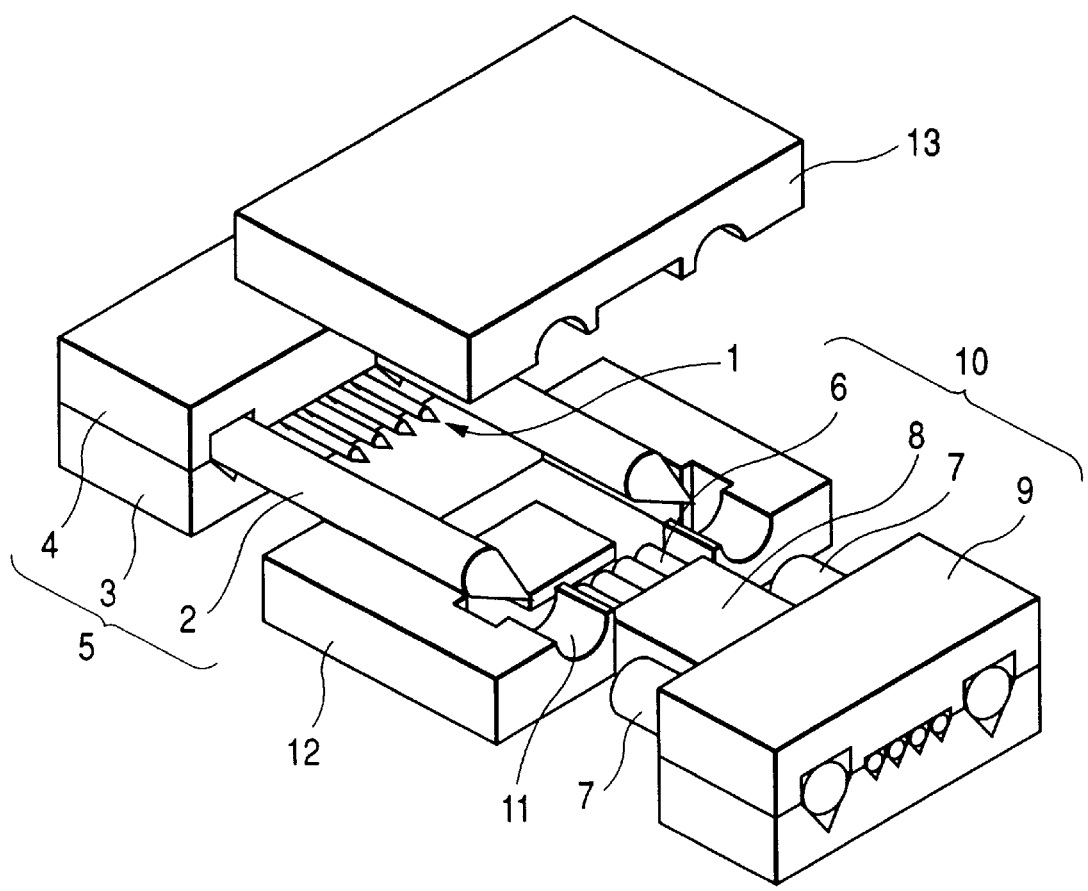
FIG. 1 is a perspective view partially showing an embodiment of a core according to the invention.

Now, embodiments will be described with reference to the accompanying figures. In the figures, the same reference numeral designates the same component.

FIG. 1 is a perspective view partially showing an embodiment of a core which is used in the method of molding an optical connector ferrule of the invention. There are two cores to be set in a mold, i.e., an end-face-side core 5 and a fiber-side core 10.

Figure 3A:
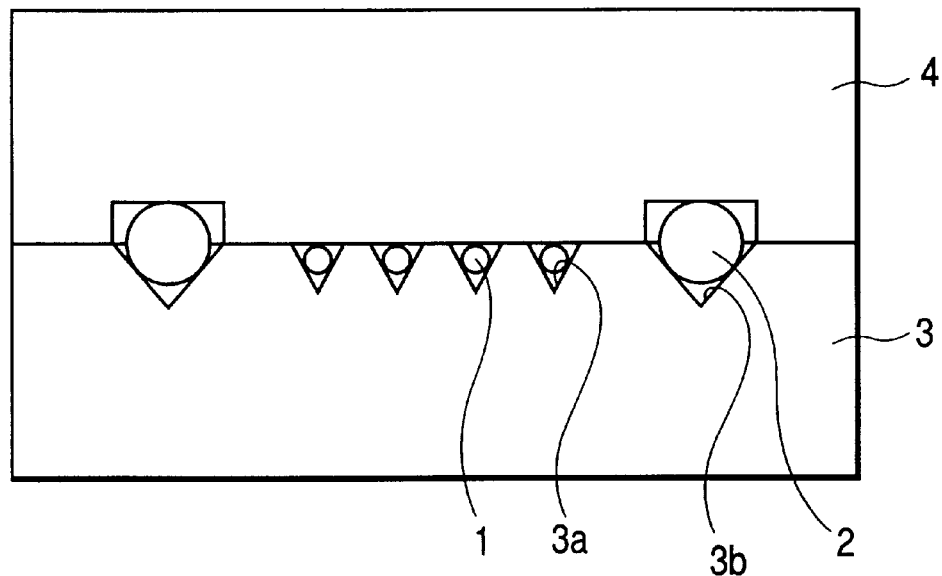

In the end-face-side core 5, four optical fiber hole forming pins 1 and two guide pin hole forming pins 2 are disposed so as to be projected from a base. In the disposition of the pins, the relative positional accuracy of the pins must be precisely ensured. Therefore, the base is split into a lower member 3 and an upper member 4. In the lower member 3, V-grooves 3a and 3b shown in FIG. 3A are formed by a precise working process. The optical fiber hole forming pins 1 and the guide pin hole forming pin 2 are placed in the V-grooves, respectively, and fixed by pressing them by the upper member 4.

FIG. 1 shows an example in which four optical fiber hole forming pins and two guide pins hole forming pin are disposed. Depending on the type of an optical connector ferrule, various modifications may be employed. For example, only one optical fiber hole forming pin may be used, no guide pin hole forming pin may be used, or plural optical fiber hole forming pins may be arranged in each of plural planes.

In the fiber-side core 10 also, guide pin hole forming pins 7 and a tape fiber hole forming rectangular body 8 are disposed so as to be projected from a core block 9. Furthermore, optical fiber hole forming pins 6 are disposed so as to be projected from the tip end of the tape fiber hole forming rectangular body 8. In the example shown in FIG. 1, a rectangular body is disposed as the tape fiber hole forming rectangular body 8 so as to be positioned behind the optical fiber hole forming pins. This configuration is employed because an optical connector ferrule which is molded by the apparatus shown in FIG. 1 is to be applied to a tape fiber. Otherwise, usually, any member may be used as far as it can form a cavity for accommodating a covered portion of an optical fiber core which is larger than the optical fiber hole forming pin. In the case where on optical fiber hole forming pin is used, for example, a column shape member may be used which forms a hole having an inner diameter allowing a covered core of an optical fiber to enter the hole.

Figure 3B:
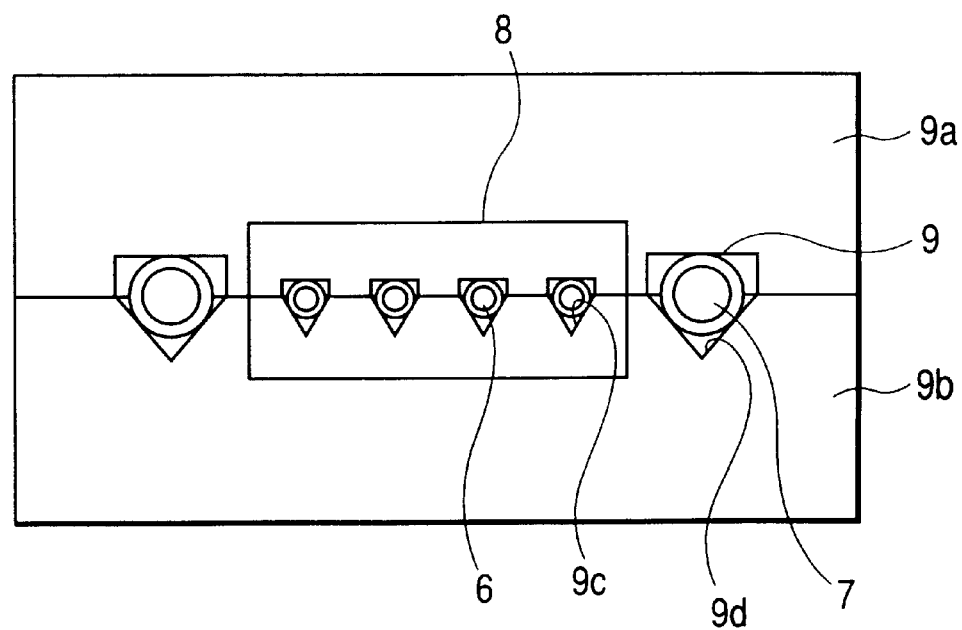

In the fiber-side core also, as shown in FIG. 3B, the core block 9 is split into an upper member 9a and a lower member 9b. In the lower member 9b, V-grooves 9c and 9d are formed. The optical fiber hole forming pins 6 and the guide pin hole forming pin 7 are placed in the V-grooves, respectively, and fixed by pressing them by the upper member 9a. The tape fiber hole forming rectangular body 8 is attached to the core block 9 so that the optical fiber hole forming pins 6 pass through the body.

Alternatively, the core block 9 and the tape fiber hole forming rectangular body 8 may be integrally produced. In the alternative, the core block 9 and the tape fiber hole forming rectangular body 8 may be integrated with each other and then split into the upper and lower members, and the V-grooves into which the optical fiber hole forming pins are to be set may be disposed in the lower-member portion of the tape fiber hole forming rectangular body 8.

As shown in FIGS. 3A and 3B, gaps are formed between the guide pin hole forming pins 2 and 7 or the optical fiber hole forming pins 1 and 6, and the V-grooves of the lower member or the upper member. In the same manner as the prior art, therefore, the molding resin may enter the gaps. In the invention, however, the upper members 4 and 9a and the lower member 3 and 9b are not opened for each molding operation, and hence the entering resin does not lower the positional accuracy of the pins.

The gaps between the guide pin hole forming pins 2 and 7 or the optical fiber hole forming pins 1 and 6, and the V-grooves of the lower members 3 and 9b or the upper members 4 and 9a may be filled with a heat-resistant adhesive member, solder, or the like. In this case, the molding resin does not enter the gaps, so that burrs or the like do not remain at edges of the resin molded product.

Figure 4A:
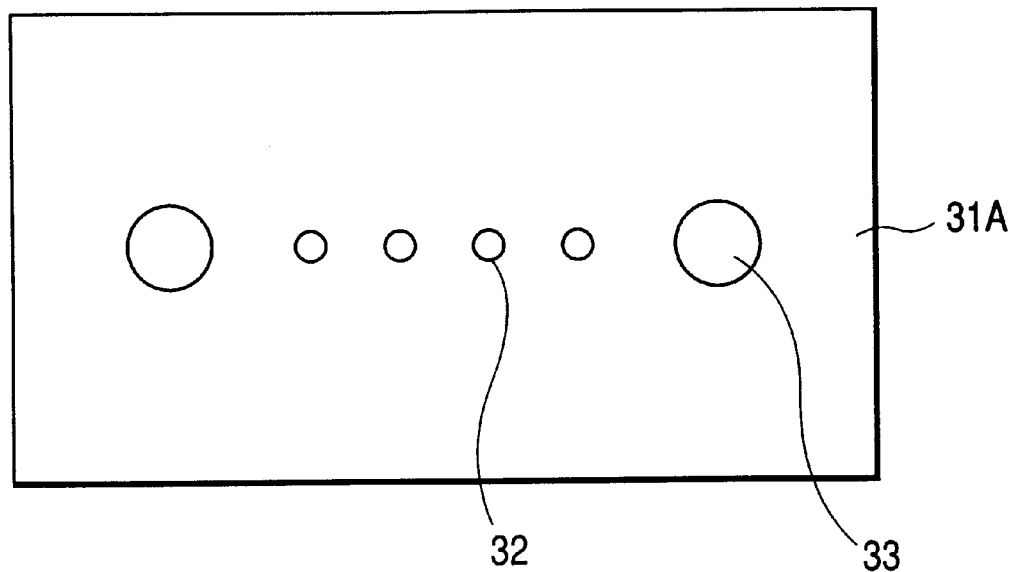
FIG. 4A is a front view of an example of a resin-entrance preventing plate.
Figure 4B:
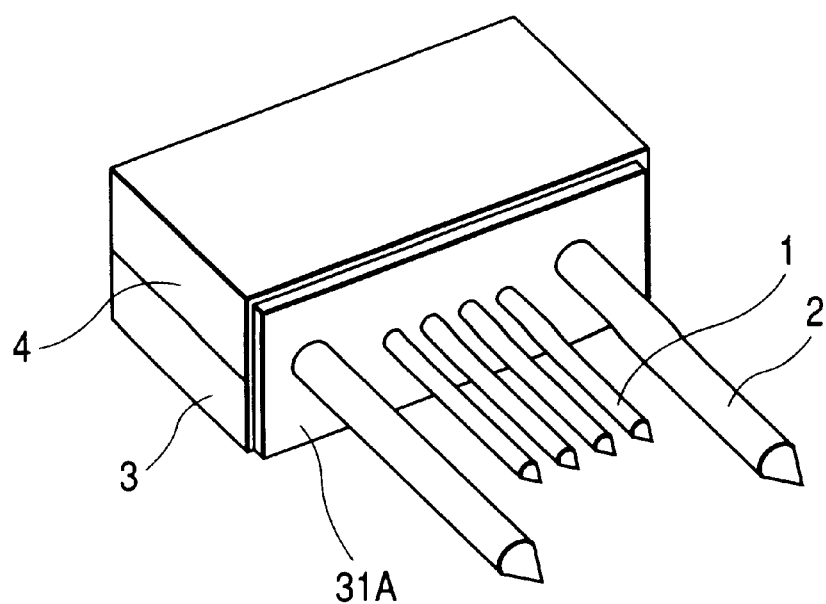
FIG. 4B is a perspective view of an end-face-side core to which the plate is fitted.

A plate 31 for preventing the entrance of a resin and having holes 32 through which the optical fiber hole forming pins pass, and holes 33 through which the guide pin hole forming pins pass as shown in FIG. 4A may be used. As shown in FIG. 4B, the plate is attached to the end faces of the upper and lower members 4 and 3 on the side of the cavity so that the optical fiber hole forming pins 1 and the guide pin hole forming pins 2 pass through the plate. According to this configuration, the molding resin does not enter the gaps in the vicinity of the V-grooves. This configuration can be applied not only to the end-face-side core butt also to the fiber-side core.

Figure 11A:
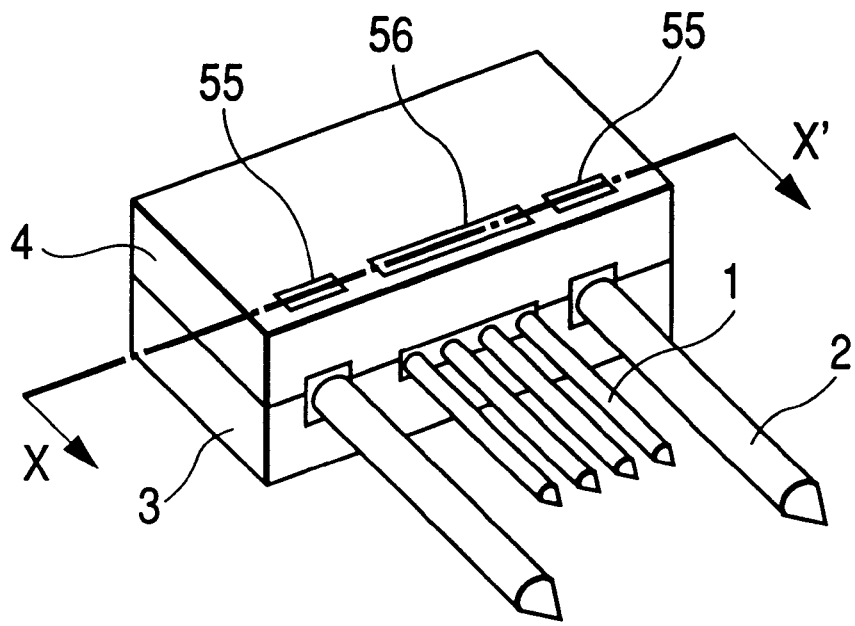
Figure 11B:
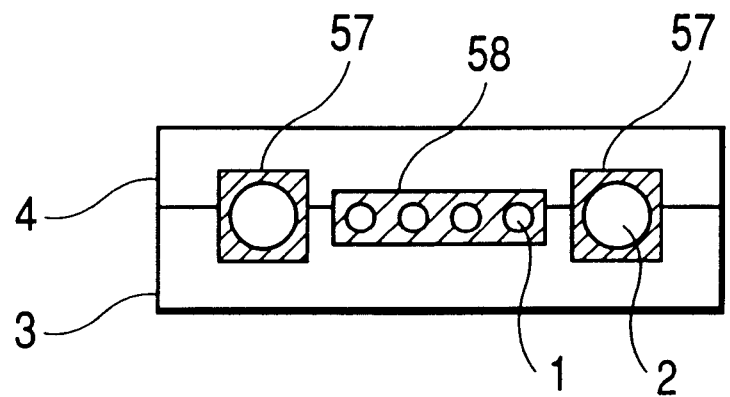

A configuration such as shown in FIGS. 11A and 11B may be employed. Windows 55 and 56 are formed in a portion of the end-face-side core which is close to the cavity. Resin-entrance preventing plates 57 and 58 having a hole(s) through which the optical fiber hole forming pins 1 and the guide pin hole forming pins 2 pass are fitted to the windows, respectively. Thereafter, the optical fiber hole forming pins 1, the guide pin hole forming pins 2, the upper member 4, and the lower member 4 are assembled together. As a result, a possibility that the molding resin enters a deep portion in the vicinity of the V-grooves is eliminated.

This configuration also can be applied not only to the end-face-side core but also to the fiber-side core. Since the fiber hole forming pins 1 are thinner than the guide pin hole forming pins 2, it is not required to pay much consideration to the fiber hole forming pins. Consequently, the sheet-like plate 58 may be omitted. As the plates 31, 57, and 58 for preventing the entrance of the resin, steel plates having a thickness of about 0.3 mm may be used.

Figure 2A:
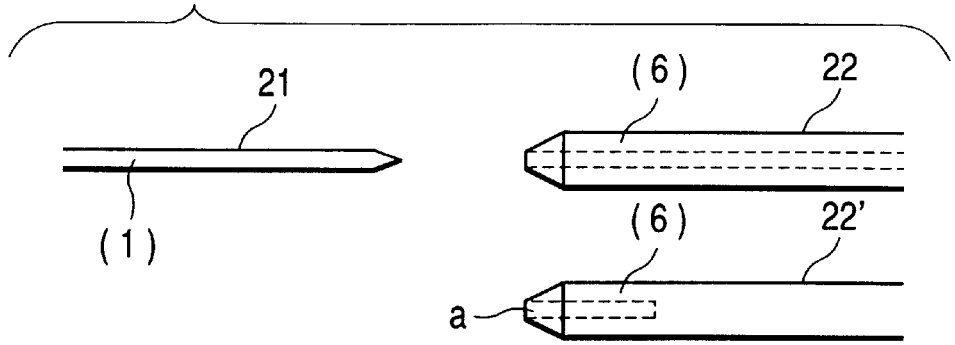
Figure 2B:
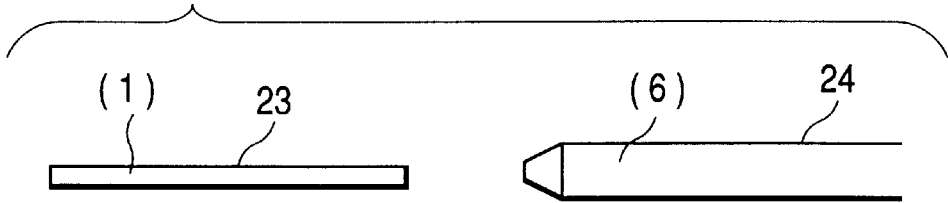

Next, the shapes of the pins will be described. FIGS. 2A to 2D are side views of the optical fiber hole forming pins 1 and the guide pin hole forming pins 2. In the figure, FIGS. 2A and 2B show optical fiber hole forming pins, and FIGS. 2C and 2D guide pin hole forming pins. In each of the pins, the left-end side is to be attached to the end-face-side core and the right side is to be attached to the fiber-side core.

Usually, a superhard steel material is used as the material of the optical fiber hole forming pins and the guide pin hole forming pins. However, the material of the pins is not restricted to this.

The tip end of the optical fiber hole forming pin 21 shown in FIG. 2A is sharpened or has a point angle of 60 deg. or less, so that it can be easily inserted into the hole of the tip end portion of a pipe shaped optical fiber hole forming pin 22. The optical fiber hole forming pin 22 is formed into a pipe shaped shape. The inner diameter of the hole is slightly larger than the outer diameter of the optical fiber hole forming pin 21. The tip end of the optical fiber hole forming pin 22 also is tapered at an angle of 60 deg. or less. When the end-face-side core and the fiber-side core are opposed to each other, the tip end of the optical fiber hole forming pin 21 is inserted into the hole of the optical fiber hole forming pin 22.

In order to prevent a step from being formed between the tapered face of the optical fiber hole forming pin 22 and the optical fiber hole forming pin 21 when the optical fiber hole forming pin 21 is inserted into the hole of the optical fiber hole forming pin 22, preferably, the tip end portion of the optical fiber hole forming pin 22 has a thickness of 5 μm or less.

In an optical fiber hole forming pin of the fiber-side core, a hole which passes through the whole length of the pin may be formed as in the case of the pin 22. Alternatively, a hole portion a may be formed only in the tip end as in the case of a pin 22'. In the alternative also, there arises no problem in the opposed state of the end-face-side core and the fiber-side core.

When the difference between the outer diameter of the optical fiber hole forming pin 21 and the diameter of the hole of the optical fiber hole forming pin 22 or 22' is set to be 10 μm or less, the molding resin does not enter through the gap formed between the pins.

Figure 9:
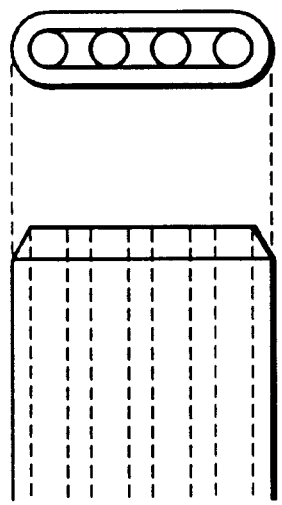
FIG. 9 is a perspective view showing an example of a coupled member of optical fiber hole forming pins of the fiber-side core.
Figure 10:
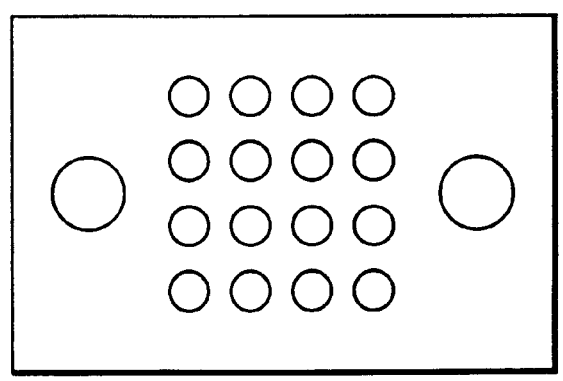
FIG. 10 is a plan view showing an example in which the optical fiber hole forming pins are formed in plural planes.

In the case where plural optical fiber hole forming pins are used, it may be usually contemplated that plural pins having a circular section shape as shown in FIGS. 2A to 2D are disposed. Alternatively, plural optical fiber hole forming pins of the fiber-side core may be coupled to each other so as to be configured as a coupled member such as shown in FIG. 9.

Both optical fiber hole forming pins 23 and 24 of FIG. 2B have a column shaped shape. The diameter of the optical fiber hole forming pin 24 is larger than that of the optical fiber hole forming pin 23. When the end-face-side core and the fiber-side core are opposed to each other, the tip end faces of the optical fiber hole forming pins 23 and 24 are in contact with each other or butt against each other forming a gap of 10 μm or less therebetween. In the tip end portion of the optical fiber hole forming pin 24, the part which is larger than the outer diameter of the optical fiber hole forming pin 23 is tapered.

Since the optical fiber hole forming pin 23 has a small diameter, the length and material of the pins must be suitably selected in accordance with the pressure of the molding resin.

Figure 2C:
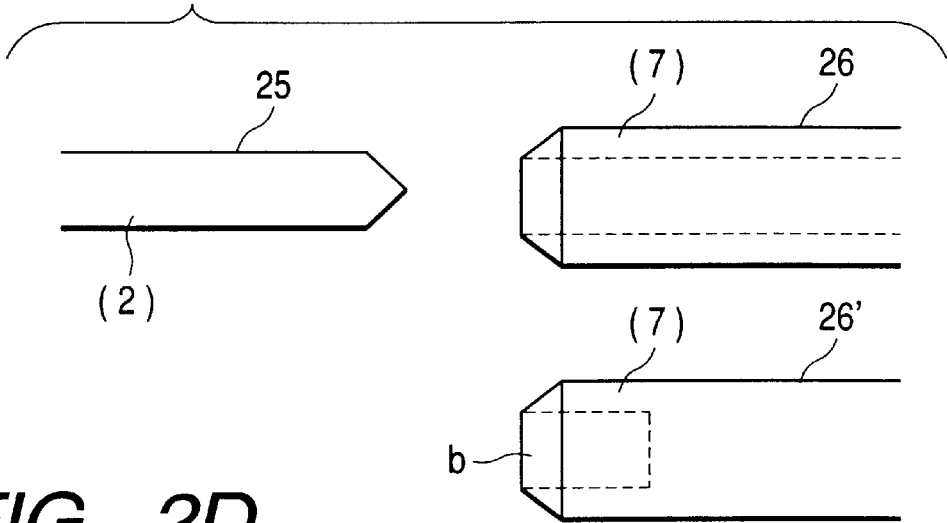

Guide pin hole forming pins 25 and 26 of FIG. 2C are larger in diameter than the optical fiber hole forming pins 21 and 22 shown in FIG. 2A, but identical in that their tip ends are sharpened at an angle of 60 deg. or less, and also in that the guide pin hole forming pin 25 is inserted into the hole of the pipe of the guide pin hole forming pin 26. In a guide pin hole forming pin also, in the same manner as the optical fiber hole forming pins, a hole which passes through the whole length of the pin may be formed as in the case of the pin 26. Alternatively, a hole portion b may be formed only in the tip end as in the case of a pin 26'.

In the configuration in which the hole of at least one of the optical fiber hole forming pins or the guide pin hole forming pins of the fiber-side core passes through the whole length of the pin, it is expected to attain an effect that a gas which is generated from the molding resin injected into the cavity is allowed to escape through the hole.

The difference between the outer diameter of the guide pin hole forming pin 25 and the diameter of the hole of the guide pin hole forming pin 26 or 26' is set to be 10 μm or less.

Figure 2D:
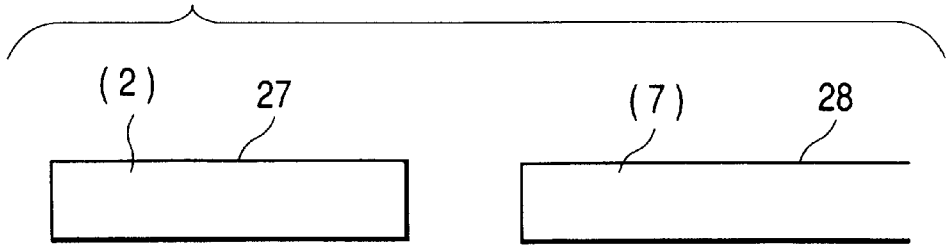

Guide pin hole forming pins 27 and 28 of FIG. 2D are shown in the figure so as to have the same diameter. Alternatively, the outer diameter of the forming pin 28 may be made larger than that of the forming pin 27 depending on the desired shape of the guide pins. In the alternative also, in the same manner as the case of FIG. 2B, when the end-face-side core and the fiber-side core are opposed to each other, the tip end faces of the guide pin hole forming pins 27 and 28 are in contact with each other or butt against each other with forming a gap of 10 μm or less therebetween.

Figure 5A:
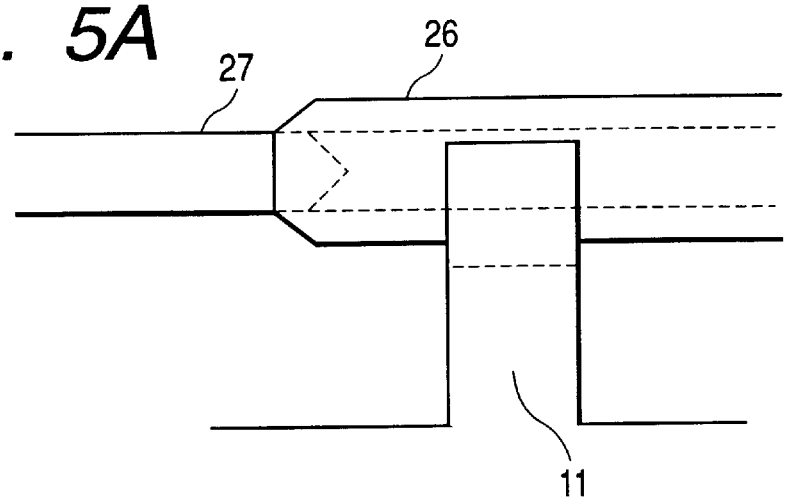
FIGS. 5A to 5D are side views showing various examples of the method of supporting guide pin hole forming pins by a supporting portion of a lower mold part.

Thereafter, the end-face-side core and the fiber-side core are fastened to each other from both the sides (in FIG. 1, the upper and lower sides) by the cavity-blocks while the cores are opposed to each other. The method of supporting the guide pin hole forming pins when the cores are set into the mold will be described. FIGS. 5A to 5D show various examples of the method. In FIG. 5A, under the state in which the guide pin hole forming pin 25 having a sharpened tip end is inserted into the pipe like guide pin hole forming pin 26, a supporting portion 11 which is disposed on the lower cavity-block and which has a V-groove supports the guide pin hole forming pin 26.

Figure 5B:
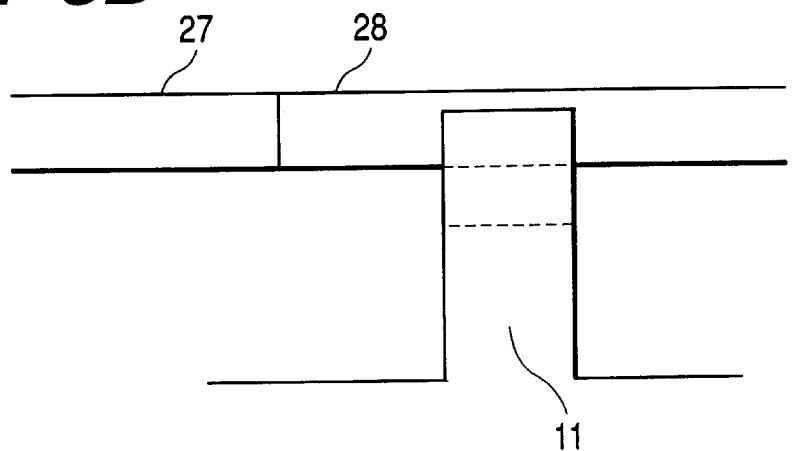

In the case of FIG. 5B, the supporting portion 11 which is disposed on the mold and which has a V-groove supports only the guide pin hole forming pin 28, and the tip end faces of the guide pin hole forming pins 28 and 27 are in contact with each other or butt against each other. The guide pin hole forming pin 27 is supported only by the base of the end-face-side core Depending on the length and material of the guide pin hole forming pin, even such a cantilever support is sufficient for the purpose.

Figure 5C:
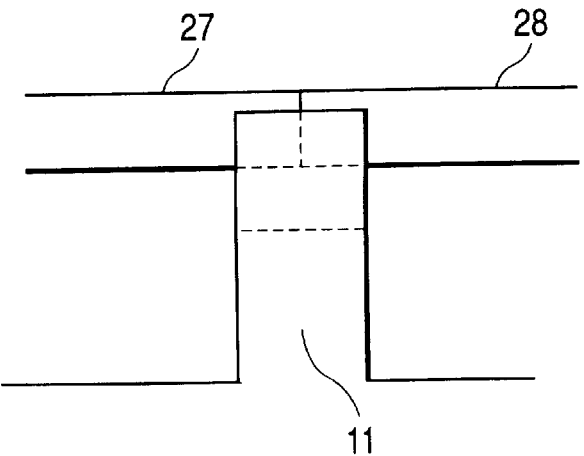
Figure 5D:
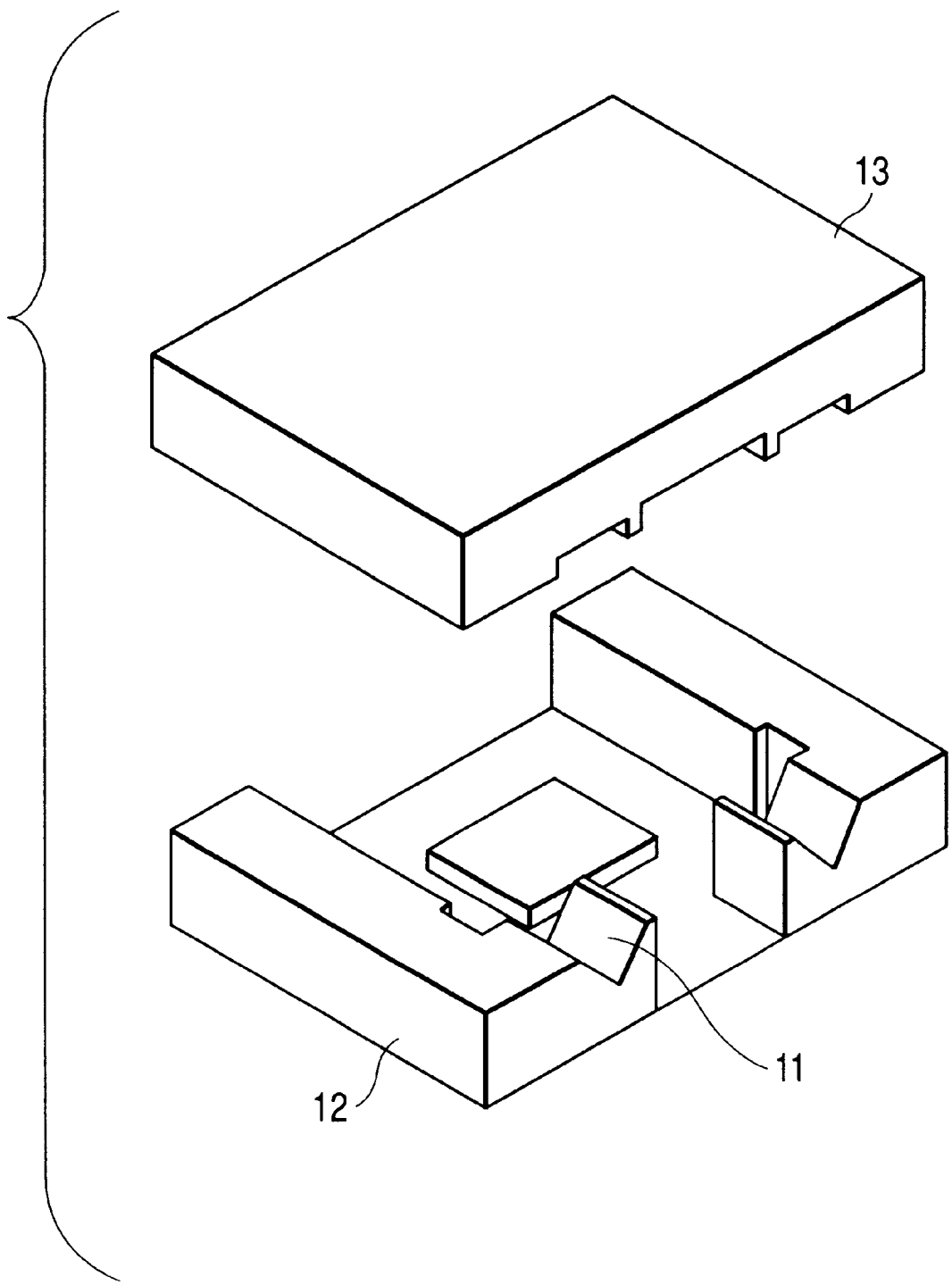
Figure 6A:
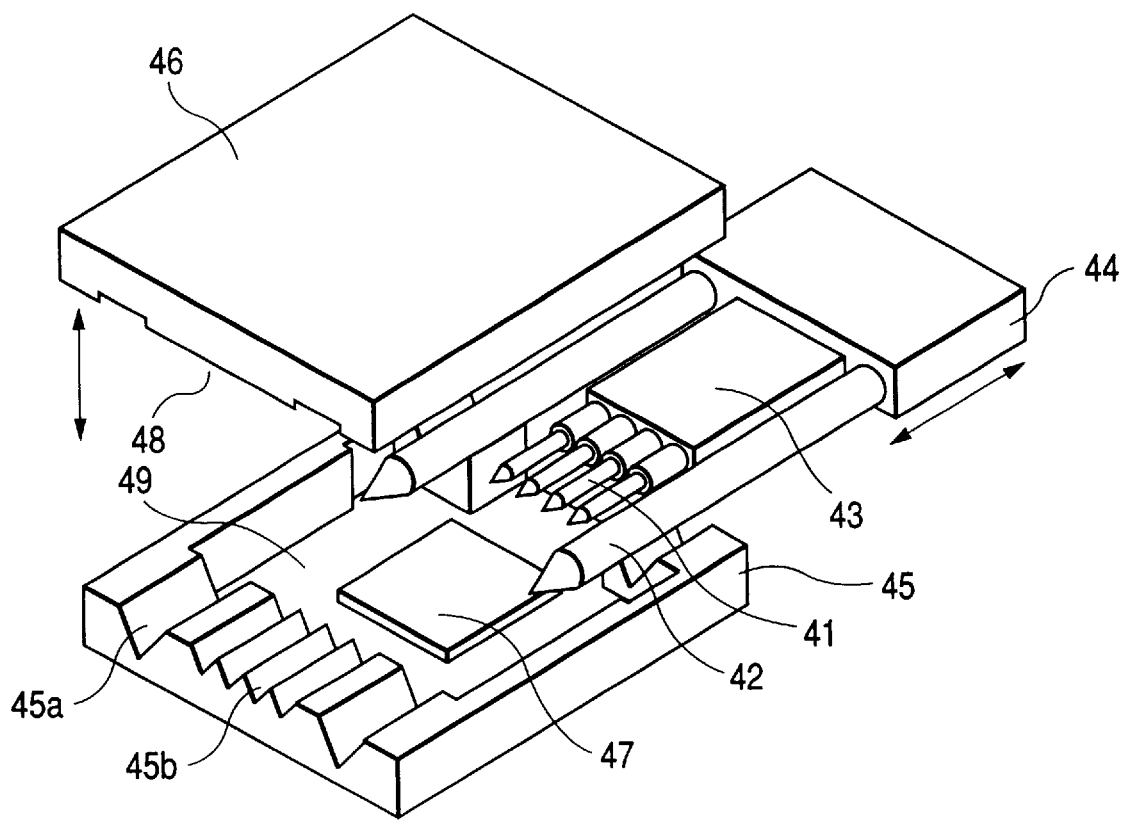
FIGS. 6A and 6B show an example of a mold which is used in a molding process of the prior art.
Figure 6B:
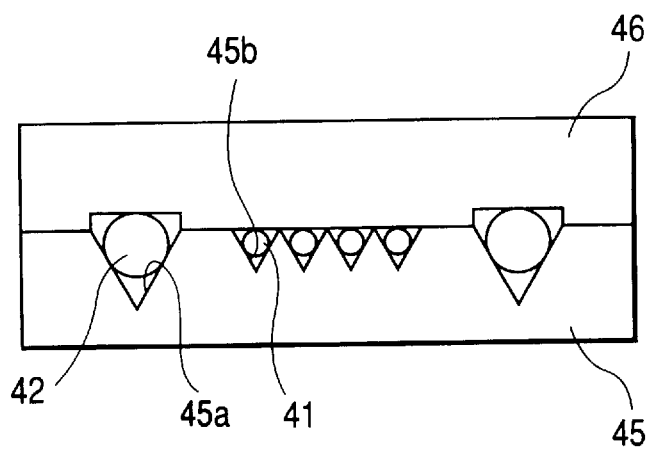
Figure 7A:
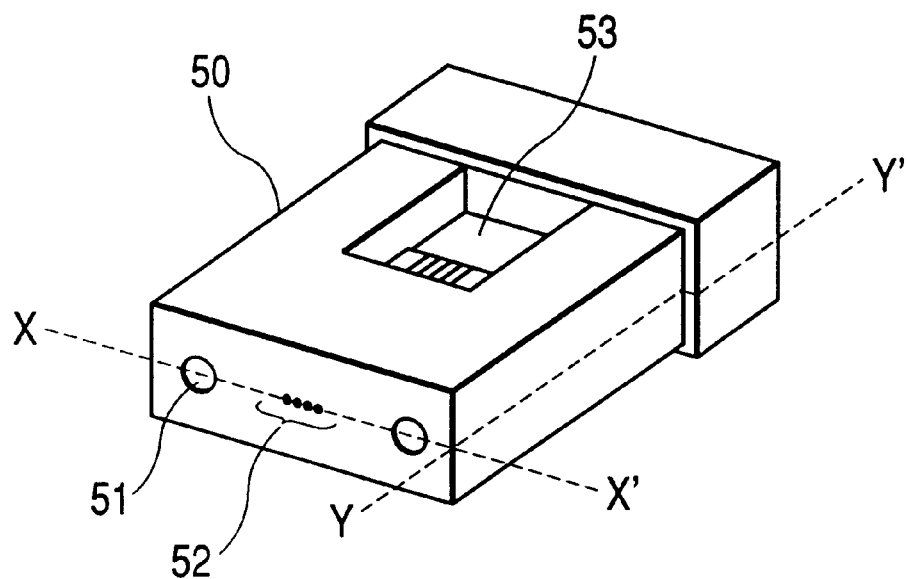
Figure 7B:
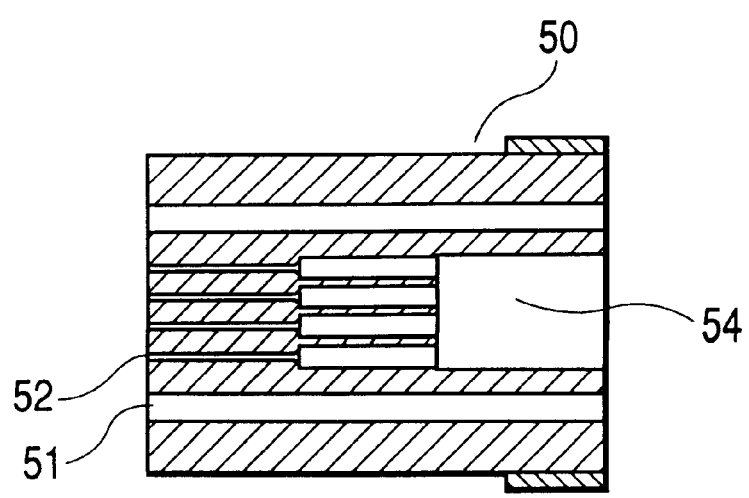

In the case of FIG. 5C, the butting faces of the guide pin hole forming pins 27 and 28 are supported by the supporting portion 11 which is disposed on the mold. In this case, each forming pin is supported at both the end portions. Even when the configuration is applied to a case where guide pin hole forming pins are long, therefore, the positional accuracy can be sufficiently maintained.

Figure 8A:
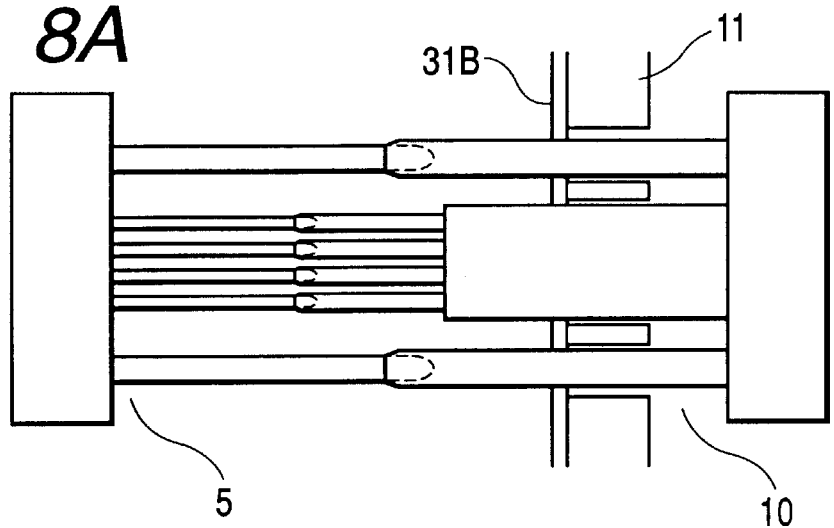
Figure 8B:
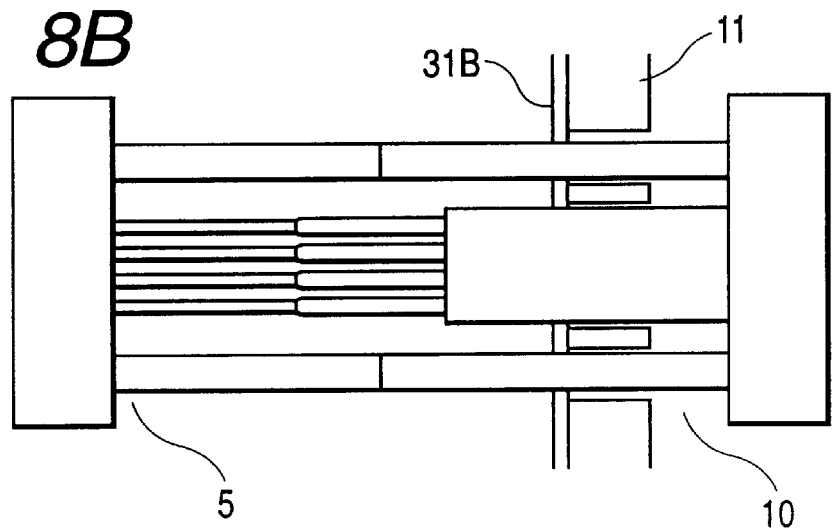
Figure 8C:
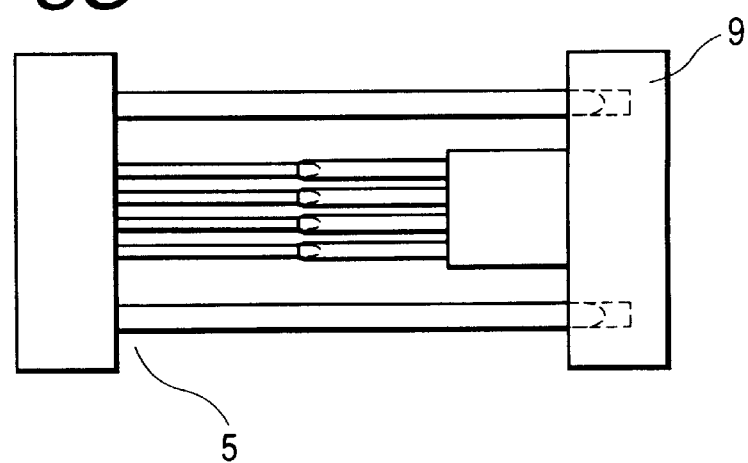

FIGS. 8A to 8C are plan views of a state in which the end-face-side core 5 and the fiber-side core 10 are supported by the V-groove 11 formed in the lower cavity block while the cores are opposed to each other. FIG. 8A shows the case where the optical fiber hole forming pins and the guide pin hole forming pins are inserted in the manner such as shown in FIG. 2A or 2C, and FIG. 8B shows the case where the optical fiber hole forming pins and the guide pin hole forming pins butt against each other in the manner such as shown in FIG. 2B or 2D. In these cases, the guide pin hole forming pins may be held by the V-grooves 11 disposed in the mold. When such a configuration is employed, it is preferable to fit a sheet-like plate 12 which prevents the resin from entering the cavity, to the cavity-side portions of the V-grooves so as to prevent the molding resin from entering gaps between the V-grooves and the guide pin hole forming pins.

FIG. 8C shows a configuration in which the optical fiber hole forming pins are disposed in the same manner as those of FIG. 8A, the guide pin hole forming pins of the end-face-side core are formed as long pins having a sharpened tip end, the fiber-side core is not provided with guide pin hole forming pins, and the guide pin hole forming pins of the end-face-side core are received by holes formed in the base of the fiber-side core. In the configuration, when the holes of the base are set to have a diameter which is not larger than (the diameter of the pins +15 μm), it is not required to dispose a resin-entrance preventing plate in this portion.

(EXAMPLES)

As Example 1, a combination of an end-face-side core, a fiber-side core, and a mold was prepared. The end-face-side core has four fiber hole forming pins shown in FIG. 2A, and two guide pin hole forming pins shown in FIG. 8C, and is provided with a resin-entrance preventing plate of the type shown in FIGS. 11A and 11B. Continuous molding of 1,000 shots was conducted by using a thermosetting epoxy resin and under the conditions of the mold temperature: about 180° C., the molding pressure: about 300 kg/cm$^2$, and the molding cycle: about 60 sec./shot. The continuous molding was enabled only by cleaning the surface of the mold by means of air blow in the course of the molding. The relative positions of the optical fiber hole forming pins and the guide pin hole forming pins of a resin mold product were not changed in the initial, intermediate, and late stages of the molding. The insertion of a tape fiber into a fiber hole was conducted without producing any problem.

As Example 2, a combination of an end-face-side core, a fiber-side core, and a mold was prepared. The end-face-side core has four fiber hole forming pins shown in FIG. 2A, and two guide pin hole forming pins shown in FIGS. 2C, 5A, and 8A, and is provided with a resin-entrance preventing plate of the type shown in FIGS. 4A and 4B. Continuous molding of 1,000 shots was conducted by using polyphenylene sulfide and under the conditions of the mold temperature: about 140° C., the molding pressure: about 1,000 kg/cm$^2$, and the molding cycle: about 40 sec./shot. The continuous molding was enabled only by cleaning the surface of the mold by means of air blow in the course of the molding. The relative positions of the optical fiber hole forming pins and the guide pin hole forming pins of a resin mold product were not changed in the initial, intermediate, and late stages of the molding. The insertion of a tape fiber into a fiber hole was conducted without producing any problem.

In the invention, since the core is split into two portions, i.e., the end-face-side core and the fiber-side core, the work of setting an optical fiber hole forming pin and a guide pin hole forming pin into a V-groove for each molding operation can be eliminated. Therefore, it is possible to solve the problem in that the forming pins are positionally deviated by chippings of a molding resin which adhere to the vicinity of the V-groove. Furthermore, the work of cleaning the V-groove for each molding shot is not required. Consequently, continuous molding is enabled and the working efficiency is very high. Since the pins are fixed to the respective cores, the front portions of the pins and the V-groove where high accuracy is particularly necessary are not worn, resulting in that the life of the mold is prolonged.

Since a gap portion in the vicinity of the V-groove is filled with a filling member or a resin-entrance preventing plate having a forming pin hole is fitted to the face of the core base on the side of the cavity, burrs are not formed in the end portions of an optical fiber insertion hole and a guide pin insertion hole. Therefore, the work of cleaning the mold for each shot can be omitted.

Since one of the optical fiber hole forming pin and the guide pin hole forming pin has a sharpened tip end, the other pin has a pipe shaped portion, and the one pin is inserted into the pipe shaped portion, the pins are supported at both the end portions. Even when the forming pins are long, therefore, the pins can sufficiently withstand the injection pressure of a resin and hence the dimensional accuracy is stabilized. When the pins are short, the holding is sufficiently conducted only by butting the forming pins against each other. Since a guide pin hole forming pin is longer than an optical fiber hole forming pin, a V-groove is formed in a supporting portion disposed on the mold so that the guide pin hole forming pin is supported by the V-groove, whereby the position of the forming pin is further stabilized.

According to the method of molding an optical connector ferrule of the invention, the work of cleaning the V-groove for each shot can be eliminated so that continuous molding is enabled, and the life of the mold is prolonged. The method of the invention can be applied not only to a transfer molding process but also to an injection molding process. Furthermore, the method of molding an optical connector ferrule of the invention can be applied not only to molding of an optical connector ferrule having plural optical fiber insertion holes, but also to that of an optical connector ferrule having a single core.

What is claimed is:

1. A method of molding an optical connector ferrule having at least one optical fiber insertion hole, said method comprising:

opposing, to each other, an end-face-side core in which at least one optical fiber hole forming pin is provided so as to be projected therefrom and a fiber-side core in which at least one optical fiber hole forming pin and a cavity forming member are provided so as to be projected therefrom, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins, said cavity forming member being behind said optical fiber hole forming pin and larger than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product.

2. A method of molding an optical connector ferrule having at least one optical fiber insertion hole and at least one guide pin insertion hole, said method comprising:

opposing, to each other, an end-face-side core in which at least one optical fiber hole forming pin and a guide pin hole forming pin which is larger in diameter than said optical fiber hole forming pin are provided so as to be projected therefrom and a fiber-side core in which at least one optical fiber hole forming pin, one guide pin hole forming pin which is larger in diameter than said optical fiber hole forming pin, and a cavity forming member are provided so as to be projected therefrom, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins, said cavity forming member being behind said optical fiber hole forming pin and larger than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product.

3. A method of molding an optical connector ferrule having at least one optical fiber insertion hole and at least one guide pin insertion hole, said method comprising:

opposing, to each other, an end-face-side core in which at least one optical fiber hole forming pin and at least one guide pin hole forming pin that has a sharpened end and that is larger in diameter than said optical fiber hole forming pin are provided so as to be projected therefrom and a fiber-side core in which at least one optical fiber hole forming pin and a cavity forming member are provided so as to be projected therefrom, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins, said fiber-side core having a hole into which the tip end portion of said guide pin hole forming pin can be inserted, said cavity forming member being behind said optical fiber hole forming pin, said hole being larger in diameter than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product.

4. A method of molding an optical connector ferrule according to claim 2 or 3, wherein said optical fiber hole forming pins and said guide pin hole forming pins of both said end-face-side core and said fiber-side core are held fixed by a lower core block.

5. A method of molding an optical connector ferrule according to claim 4, wherein gaps which are formed between said optical fiber hole forming pin or said guide pin hole forming pin, said V-groove and said upper core-block are filled with a filling member.

6. A method of molding an optical connector ferrule according to claim 4, wherein a plate having holes which respectively coincide with said optical fiber hole forming pin and said guide pin hole forming pin is fitted to a cavity-side portion, to prevent a gap which is formed between said optical fiber hole forming pin or said guide pin hole forming pin of said end-face-side core of said fiber-side core, and said V-groove and said upper core block, from communicating with said cavity.

7. A method of molding an optical connector ferrule according to claim 4, wherein a plate having holes which respectively coincide with said optical fiber hole forming pin and said guide pin hole forming pin is fitted to a portion which is inside said end-face-side core or said fiber-side core and which is close to said cavity, thereby preventing a gap which is formed between said optical fiber hole forming pin or said guide pin hole forming pin of said end-face-side core or said fiber-side core, and said V-groove and said upper member, from communicating with said cavity.

8. A method of molding an optical connector ferrule having at least one optical fiber insertion hole, said method comprising:

opposing, to each other, an end-face-side core in which at least one optical fiber hole forming pin is provided so as to be projected therefrom and a fiber-side core in which at least one optical fiber hole forming pin and a cavity forming member are provided so as to be projected therefrom, said cavity forming member being behind said optical fiber hole forming pin and larger than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product;

wherein said optical fiber hole forming pin of said end-face-side core is configured to a small-diameter pin having a sharpened tip end, said optical fiber hole forming pin of said fiber-side core is configured to a member which has a hole at least in a tip end portion, said hole being larger in diameter than said small-diameter pin to enable said small-diameter pin to enter said hole, and, when said end-face-side core and said fiber-side core are opposed to each other, said small-diameter pin is inserted into said hole at the tip end of said large-diameter member.

9. A method of molding an optical connector ferrule according to any one of claims 1 to 3, wherein said optical fiber hole forming pin of said end-face-side core is configured to a column shaped small-diameter pin, said optical fiber hole forming pin of said fiber-side core is configured to a column shaped pin which is larger in diameter than said small-diameter pin, and, when said end-face-side core and said fiber-side core are opposed to each other, tip end faces of said small-diameter pin and said large-diameter pin are in contact with each other or butt against each other with forming a very small gap therebetween.

10. A method of molding an optical connector ferrule according to claim 2, wherein said guide pin hole forming pin of said end-face-side core is configured to a pin having a sharpened tip end, said guide pin hole forming pin of said fiber-side core is configured to a member which has a hole at least in a tip end portion, said hole being larger in diameter than said sharpened pin, and, when said end-face-side core and said fiber-side core are opposed to each other, said sharpened pin is inserted into said hole at the tip end of said large-diameter member.

11. A method of molding an optical connector ferrule having at least one optical fiber insertion hole and at least one guide pin insertion hole, said method comprising:

opposing, to each other, an end-face-side core in which at least one optical fiber hole forming pin and a guide pin hole forming pin which is larger in diameter than said optical fiber hole forming pin are provided so as to be projected therefrom and a fiber-side core in which at least one optical fiber hole forming pin, one guide pin hole forming pin which is larger in diameter than said optical fiber hole forming pin, and a cavity forming member are provided so as to be projected therefrom, said cavity forming member being behind said optical fiber hole forming pin and larger than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product;

wherein said guide pin hole forming pin of said end-face-side core is configured to a pin having a sharpened tip end, said guide pin hole forming pin of said fiber-side core is configured to a member which has a hole at least in a tip end portion, said hole being larger in diameter than said sharpened pin, and, when said end-face-side core and said fiber-side core are opposed to each other, said sharpened pin is inserted into said hole at the tip end of said large-diameter member; and wherein at least one of said optical fiber hole forming pin and said guide pin hole forming pin of said fiber-side core is configured to a pin having a hole formed through the hole length thereof.

12. A method of molding an optical connector ferrule having at least one optical fiber insertion hole and at least one guide pin insertion hole, said method comprising:

opposing, to each other, an end-face-side core in which at least one optical fiber hole forming pin and a guide pin hole forming pin which is larger in diameter than said optical fiber hole forming pin are provided so as to be projected therefrom and a fiber-side core in which at least one optical fiber hole forming pin, one guide pin hole forming pin which is larger in diameter than said optical fiber hole forming pin, and a cavity forming member are provided so as to be projected therefrom, said cavity forming member being behind said optical fiber hole forming pin and larger than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product;

wherein said optical fiber hole forming pin and said guide pin hole forming pin of said end-face-side core are respectively configured to pins having a sharpened tip end, said optical fiber hole forming pin and said guide pin hole forming pin of said fiber-side core are respectively configured to members which have a hole at least in a tip end portion, said hole being larger in diameter than sharpened pins of said end-face-side core to enable said sharpened pins to enter said holes, and, when said end-face-side core and said fiber-side core are opposed to each other, said tip end portion of said guide pin hole forming pin of said end-face-side core is first inserted into said hole of said tip end portion of said guide pin hole forming pin of said fiber-side core, and said tip end portion of said optical fiber hole forming pin of said end-face-side core is then inserted into said hole of said tip end portion of said optical fiber hole forming pin of said fiber-side core.

13. A method of molding an optical connector ferrule having at least one optical fiber insertion hole and at least one guide pin insertion hole, said method comprising:

opposing, to each other, an end-face-side core in which at least one optical fiber hole forming pin and at least one guide pin hole forming pin that has a sharpened end and that is larger in diameter than said optical fiber hole forming pin are provided so as to be projected therefrom and a fiber-side core in which at least one optical fiber hole forming pin and members are provided so as to be projected therefrom, said fiber-side core having a hole into which the tip end portion of said guide pin hole forming pin can be inserted, said members being behind said optical fiber hole forming pin, said hole being larger in diameter than said optical fiber hole forming pin;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product;

wherein said optical fiber hole forming pin of said end-face-side core is configured to a pin having a sharpened tip end, said optical fiber hole forming pin of said fiber-side core is configured to a member which has a hole at least in a tip end portion, said hole being larger in diameter than said sharpened pin to enable said sharpened pin to enter said hole, and, when said end-face-side core and said fiber-side core are opposed to each other, said tip end portion of said guide pin hole forming pin of said end-face-side core is first inserted into said hole of said hole for said guide in pin hole forming pin which is formed in said fiber-side core, and said tip end portion of said optical fiber hole forming pin of said end-face-side core is then inserted into said hole of said tip end portion of said optical fiber hole forming pin of said fiber-side core.

14. A method of molding an optical connector ferrule according to claim 2, wherein said guide pin hole forming pin of said end-face-side core is configured to a column shaped large-diameter pin, said guide pin hole forming pin of said fiber-side core is configured to a column shaped pin member which is equal to or larger in diameter than said guide pin hole forming pin of said end-face-side core, and, when said end-face-side core and said fiber-side core are opposed to each other, tip end faces of said guide pin hole forming pins of said end-face-side core and said fiber-side core are in contact with each other or butt against each other with forming a very small gap therebetween.

15. A method of molding an optical connector ferrule according to claim 2, wherein, when said end-face-side core and said fiber-side core are fastened to each other by cavity-blocks while said cores are opposed to each other, said guide pin hole forming pin of said fiber-side core is held by a V-groove formed in a lower cavity block.

16. A method of molding an optical connector ferrule according to claim 2, wherein, when said end-face-side core and said fiber-side core are fastened to each other by said mold while said cores are opposed to each other, butting faces of said guide pin hole forming pins of said end-face-side core and said fiber-side core are held by a V-groove formed in a lower cavity block.

17. A device for molding an optical connector ferrule having at least one optical fiber insertion hole, said device comprising:

an end-face-side core from which at least one optical fiber hole forming pin is projected;

a fiber-side core from which at least one optical fiber hole forming pin and a cavity forming member are projected to each other, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins, said cavity forming member being behind said optical fiber hole forming pin and larger than said optical fiber hole forming pin;

a mold by which said end-face-side core is fastened to said fiber-side core to form a cavity therein into which a resin is injected when molding said optical connector ferrule.

18. A method of molding an optical connector ferrule having at least one optical fiber insertion hole, said method comprising:

opposing, to each other, an end-face-side core in which at least one optical fiber hole forming pin is provided so as to be projected therefrom and a fiber-side core in which at least one optical fiber hole forming pin is provided so as to be projected therefrom, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product.

19. A method of molding an optical connector ferrule having at least one optical fiber insertion hole and at least one guide pin insertion hole, said method comprising:

opposing, to each other, an end-face-side core in which at least one optical fiber hole forming pin and a guide pin hole forming pin which is larger in diameter than said optical fiber hole forming pin are provided so as to be projected therefrom and a fiber-side core in which at least one optical fiber hole forming pin and at least one guide pin hole forming pin which is larger in diameter than said optical fiber hole forming pin are provided so as to be projected therefrom, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins;

fastening said end-face-side core and said fiber-side core together with cavity-blocks so as to form a mold;

injecting a resin into a cavity formed in said mold;

opening said mold;

sliding said end-face-side core and said fiber-side core in directions in which said cores are to be separated from each other; and taking out a resin molded product.

20. A method of molding an optical connector ferrule having at least one optical fiber insertion hole and at least one guide pin insertion hole, said method comprising:

opposing, to each other, an end-face-side core in which at least one optical fiber hole forming pin and at least one guide pin hole forming pin that has a sharpened tip end and that is larger in diameter than said optical fiber hole forming pin are provided so as to be projected therefrom, and a fiber-side core in which at least one optical fiber hole forming pin is provided so as to be projected therefrom, said at least one optical fiber hole forming pin in said end-face-side core cooperating with said at least one optical fiber hole forming pin in said fiber-side core such that one of said at least one optical fiber hole forming pin in said end-face-side core and said at least one optical fiber hole forming pin in said fiber-side core pins is insertable into the other of said pins, and said fiber-side core having a hole into which the tip end portion of said guide pin hole forming pin can be inserted, said hole being larger in diameter than said optical fiber hole forming pin;

fastening said end-face-side core and said fiber-side core together with cavity-blocks so as to form a mold;

injecting a resin into a cavity formed in said mold;

opening said mold; sliding said end-face-side core and said fiber-side core in a direction in which said cores are to be separated from each other; and taking out a resin molded product.

* * * * *